United States Patent
Cornia

[19]

[11] Patent Number: 6,105,613
[45] Date of Patent: Aug. 22, 2000

[54] DISTRIBUTOR FOR A HYDRAULIC HOIST WHICH IS CONTROLLABLE WITH REGARD TO POSITION AND APPLIED FORCE, FOR TRACTORS AND AGRICULTURAL MACHINES

[75] Inventor: Enrico Maria Cornia, Modena, Italy

[73] Assignee: Mita Oleodinamica S.p.A., Verona, Italy

[21] Appl. No.: 09/214,761

[22] PCT Filed: May 7, 1998

[86] PCT No.: PCT/EP98/02694

§ 371 Date: Mar. 12, 1999

§ 102(e) Date: Mar. 12, 1999

[87] PCT Pub. No.: WO98/51932

PCT Pub. Date: Nov. 19, 1998

[30] Foreign Application Priority Data

May 13, 1997 [IT] Italy ................................. B097A0289

[51] Int. Cl.[7] .................................................. F15B 13/04
[52] U.S. Cl. ........................................ 137/596.13; 91/452
[58] Field of Search .......................... 137/596.13; 91/452

[56] References Cited

U.S. PATENT DOCUMENTS 4,176,685  12/1979  Hoefer et al. ...................... 137/596.13
4,246,832   1/1981  Hofer et al. ........................... 91/461 X

FOREIGN PATENT DOCUMENTS

| 0 386 591 | 9/1990 | European Pat. Off. . |
| 31 15 037A | 11/1982 | Germany . |
| 32 16 580A | 2/1983 | Germany . |
| 32 37 103A | 4/1984 | Germany . |
| 58-1213030 | 7/1983 | Japan . |
| 2 016 652A | 9/1979 | United Kingdom . |

Primary Examiner—Gerald A. Michalsky
Attorney, Agent, or Firm—Sughrue, Mion, Zinn, Macpeak & Seas, PLLC

[57] ABSTRACT

A distributor for a hydraulic hoist which is controllable with regard to position and applied force, for tractors and agricultural machines, comprises a compact body having at least one inlet duct for a pressurized fluid, at least one discharge duct and at least one duct for connection to a hydraulic cylinder for lifting the hoist arms. Arranged in the body of the distributor are a valve for modulating the flow of pressurized fluid and for communicating with the connecting duct by way of a main internal duct and a valve unit for discharging the fluid coming from the hydraulic lifting cylinder. A slider is movable inside the cylindrical body in two opposite directions with respect to a neutral position and controls the modulating valve hydraulically, preferably with the interposition of a consent valve. The slider also controls the discharge valve unit and a variable choke member arranged in the main internal duct.

9 Claims, 2 Drawing Sheets

DISTRIBUTOR FOR A HYDRAULIC HOIST WHICH IS CONTROLLABLE WITH REGARD TO POSITION AND APPLIED FORCE, FOR TRACTORS AND AGRICULTURAL MACHINES

BACKGROUND OF THE INVENTION

The present invention relates to a distributor for a hydraulic hoist which is controllable with regard to position and applied force, for tractors and agricultural machines. In particular, this distributor is to be used to regulate and control the movement of a three-point coupling which is mounted on the tractor or agricultural machine and to which an implement for working or preparing the ground is connected.

Various types of hoist for three-point couplings and various types of distributor which are to control the movement thereof are known. One of those known distributors is described, for example, in Italian patent application MO91A000137 belonging to the same applicant. Basically, distributor of the known type comprises a substantially cylindrical and compact body in which various valve elements are arranged, the most important of which is a slide valve of which the slider is operated by the hoist levers and which permits modulation of a specific rate of flow of pressurised fluid to an actuator cylinder or, alternatively, discharge from that actuator cylinder of a specific amount of fluid. Hoists are normally connected to the pressurised oil distribution system which is already arranged on the agricultural machine for other equipment.

Oil distribution systems normally comprise positive-displacement pumps which, in most tractors, are of the fixed displacement type because they are far less expensive than the variable displacement type. It often happens that the oil flow necessary for the ancillary equipment of the tractor is very high; in that case, above all in the presence of fixed displacement positive-displacement pumps and of medium-low displacements of the hoist cylinders, distributors of the known type may exhibit an oscillatory behaviour owing to an instability caused by the system's excessive rate of response. In addition, the distributor is subject to pressure peaks which may prove to be detrimental both to the strength and to the precision of the system.

In order to solve the above problems the known solutions necessarily involve a substantial increase in the dimensions of the distributor or a complication of the system with the addition of separate valves in positions to which access is difficult.

SUMMARY OF THE INVENTION

The aim of the present invention is to overcome the disadvantages mentioned above by means of an improved distributor which is simple and economical to produce, is simple to install and has a compact configuration and which permits very accurate regulation of the applied force and position. In fact, with the present invention it is possible to obtain, in controlled position operation, more than 150 different positions of the hoist arms.

In order to achieve the aims indicated above, the invention discloses a new and improved distributor for a hydraulic hoist which is controllable with regard to position and applied force, for tractors and agricultural machines, comprising a compact body having at least one inlet duct for a pressurised fluid, at least one discharge duct and at least one duct for connection to a hydraulic cylinder for lifting hoist arms, there being arranged in the body valve means for modulating the flow of pressurised fluid, a slider being movable inside the body in two opposite directions with respect to a neutral position and a valve unit for discharging the fluid coming from the hydraulic cylinder, wherein the slider controls the modulating valve means hydraulically with interposition of consent valve means.

The distributor produced in accordance with the present invention is readily installed in the hoist owing to its small space requirement. In addition, the distributor comprises a complete hydraulic circuit for controlling both the flow and the pressure conveyed to an actuator cylinder.

A further advantage of the invention resides in the fact that the distributor controls the movement of the hoist arms and consequently of the three-point coupling, and thus of the agricultural implement connected thereto, in order to ensure a gentle start and a damped stop therefor both in the ascent stage and in the descent stage. The risk of kick-back on the agricultural machine and consequent oscillations is thus prevented, increasing the comfort of the operator driving the agricultural machine.

A further advantage of the invention consists in the ease of maintenance and the control of the excellent functionality of the distributor.

BRIEF DESCRIPTION OF THE DRAWINGS

Further characteristics and advantages will become clear from the following description of a preferred embodiment, with reference to the appended drawings, which are given purely by way of non-limiting example and in which.

DETAILED DESCRIPTION OF THE INVENTION

Figure 1:
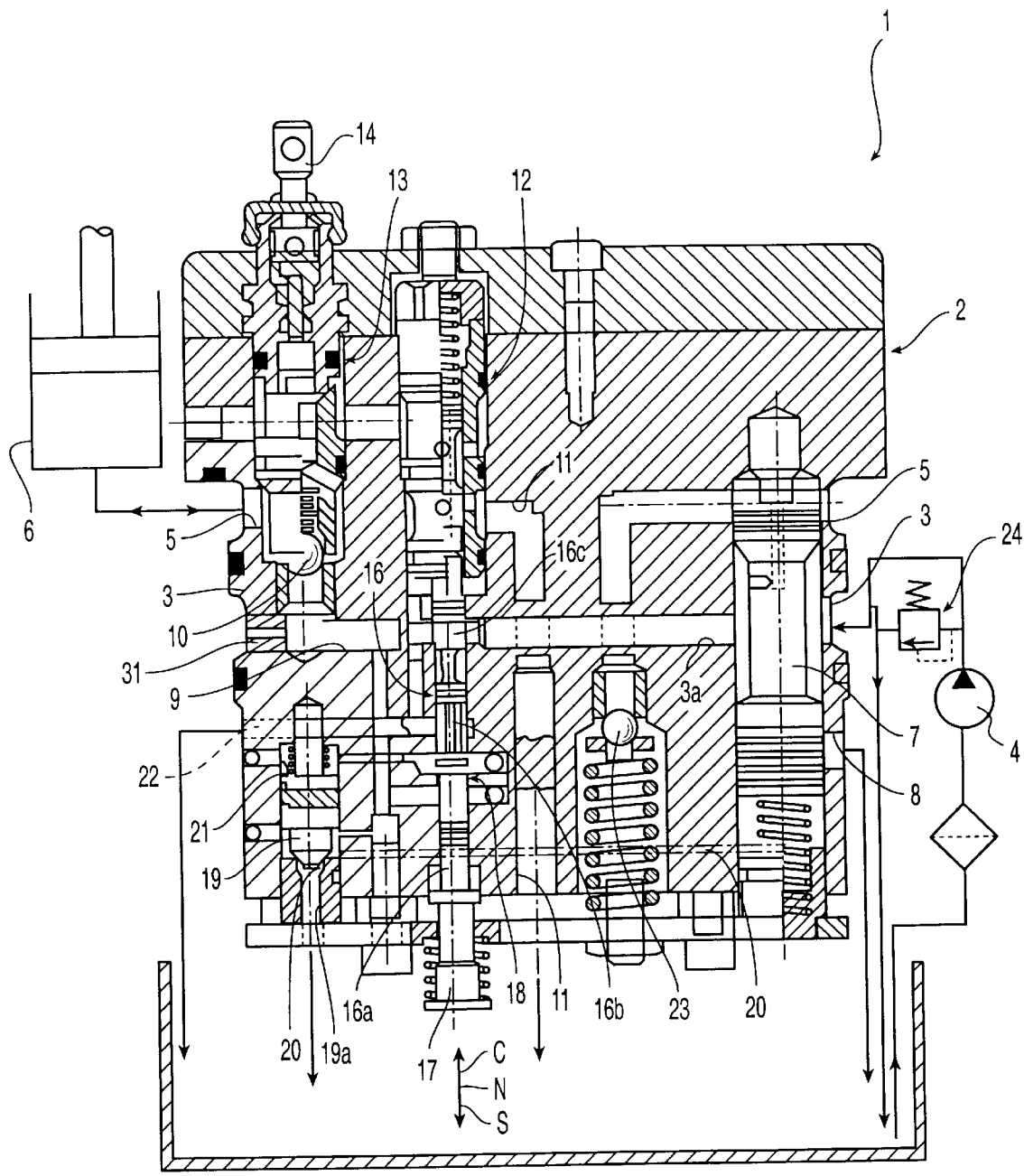
FIG. 1 is a vertical section through a distributor according to the present invention.

Referring now to FIG. 1, a distributor 1 comprises a compact body 2 which is preferably but not necessarily substantially cylindrical and around which are arranged a first annular duct 3 for delivering pressurised fluid coming from a pump 4, and a second annular duct 5 communicating with a single-acting actuator cylinder 6, which is capable of bringing about the lifting or lowering of the arms of a hoist of generally known type. The annular delivery duct 3 communicates with a flow-modulating valve 7 arranged inside the body 2 of the distributor. Depending on the position of a shaped slider 16, which is described in more detail hereinafter, the modulating valve 7 sends the fluid coming from the pump 4 to a discharge 8 or to a main transverse duct 9, 9a which leads into the second annular duct 5, and thus into the cylinder 6, passing through a non-return delivery valve 10. The main transverse duct is divided into two portions 9 and 9a by a variable choke member 16c arranged on the slider 16.

The second annular duct 5 for connection to the cylinder 6 communicates also with a main discharge duct 11 by way of a discharge valve unit 12 and a device 13 limiting the rate of descent of the cylinder 6. In particular, the limiting device 13 illustrated in FIG. 1 is of the manual regulation type which can be operated by means of an external control 14, for example having a hand wheel. The limiting device 13 can of course also be of the type which is regulated automatically as a function of the speed of the fluid which, leaving the cylinder 6, is conveyed towards the discharge 11.

The command for lifting or lowering the arms of the hoist by means of the cylinder 6 is given by the shaped slider 16 which is provided with an end head 17 projecting from the body 2. The position of the head 17 is determined by an external control which can be operated by the driver, or by the position of a system of internal levers of the hoist which, in known manner, constitute the feedback system for operation with controlled position and applied force. The slider 16 has a neutral position N from which it can be moved upwards (direction C) or downwards (direction S) in order to bring about the charging and discharging, respectively, of the cylinder 6 and thus the lifting and lowering, respectively, of the hoist arms.

In particular, the slider 16 simultaneously controls the discharge valve unit 12, the variable choke member 16c and a slide valve 18 which in turn controls a consent valve 19. To be more precise, the consent valve 19, by diverting pressurised fluid to the secondary transverse duct 20 or, alternatively, to the discharge 19a, controls the position of the modulating valve 7. The position of the consent valve 19 is determined by the fluid pressure prevailing in the upper chamber 21 which communicates with the main transverse duct 9 or, alternatively, with the discharge 22, depending on the position of the slider 16 and, more especially, of the annular grooves 16a, 16b.

Figure 2:
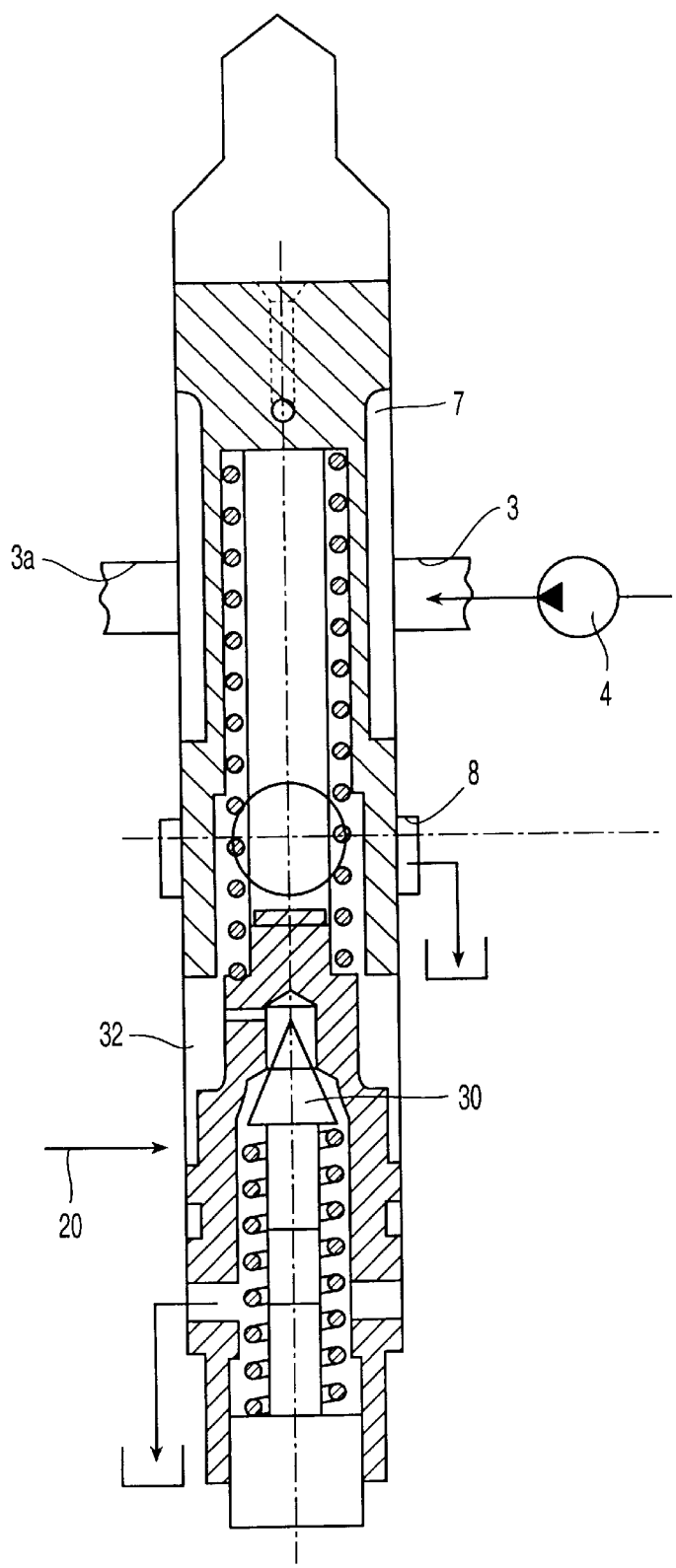
FIG. 2 is a diagrammatic vertical section through a variant of a valve unit of the present invention.

A valve 23 for limiting the pressure in the cylinder 6 completes the distributor. In the example of FIG. 1, a further valve 24 for limiting the delivery pressure of the pump is arranged outside the distributor, for example, in the body of the hoist, but it is also possible to integrate the limiting function of that further valve 24 inside the distributor. For example, as illustrated in FIG. 2, a second controlled pressure-limiting valve 30 is associated with the flow-modulating valve 7 which thus also assumes the function of a valve limiting the maximum pressure of the oil coming from the pump 4. In particular, the controlled valve 30 senses the pressure in the secondary transverse duct 20 which is always in communication with the annular delivery duct 3 by means of the fixed choke 31. When the pressure in the secondary duct 20 exceeds a predetermined threshold, the controlled valve 30 opens, bringing about the consequent opening of the modulating valve 7 which enables the oil coming from the pump 4 to be discharged to the discharge duct 8.

When the shaped slider 16 is in the neutral position N, the cylinder 6 is stationary because the discharge valve unit 12 is maintained mechanically in the closed position by the slider 16, while the modulating valve 7 is open so that the entire flow of fluid coming from the pump 4 is caused to flow away to the discharge 8. In fact, in the neutral position N, the chamber 21 is in discharge mode and therefore the consent valve 19 is open towards the discharge 19a.

When the implement connected to the hydraulic hoist is to be raised, the end head 17 is pushed upwards in the direction of arrow C so that the movement of the slider 16 causes an increase in pressure in the upper chamber 21 of the consent valve 19 which closes its own communication towards the discharge 19a, thus bringing about an increase in pressure in the secondary transverse duct 20 so that the modulating valve 7 closes the discharge opening 8. Thus, a more or less large flow of pressurised fluid, regulated by the fixed choke 31 and by the variable choke 16c, is capable of overcoming the resistance of the non-return valve 10 and of penetrating into the cylinder 6, causing the implement connected to the agricultural machine to be lifted. In particular, the variable choke 16c enables the cylinder 6 to be supplied at a variable rate which ensures a gentle start and stop for the hoist arms. For small deviations of the slider 16 from the neutral position N, the variable choke 16c is very small, while it becomes wider when the slider 16 deviates markedly from the neutral position N in the direction of arrow C.

When, on the other hand, the implement is to be lowered, the slider 16 moves in the direction of arrow S, opening the discharge valve 12. The rate of descent of the implement is controlled by the valve 13 and is set automatically or manually by means of the external control 14, depending on the type of valve 13 constructed in the distributor. When the distributor is in that state of operation, the modulating valve 7 and the consent valve 19 have a behaviour identical to that described above with reference to the neutral position N of the slider 16.

Naturally, the principle of the invention remaining the same, the forms of embodiment and details of construction may vary widely with respect to those described and illustrated, without thereby departing from the scope of the present invention.

What is claimed is:

1. A distributor for a hydraulic hoist which is controllable with regard to position and applied force, for tractors and agricultural machines, comprising a compact body (2) having at least one inlet duct (3) for a pressurised fluid, at least one discharge duct (8, 22, 11, 19a) and at least one duct (5) for connection to a hydraulic cylinder (6) for lifting hoist arms, there being arranged in the body (2) valve means (7) for modulating the flow of pressurised fluid, a slider (16) being movable inside the body (2) in two opposite directions (C, S) with respect to a neutral position (N), and a valve unit for discharging the fluid coming from the hydraulic cylinder, wherein the slider (16) controls the modulating valve means (7) hydraulically with interposition of consent valve means (19) and wherein the slider (16) controls the discharge valve unit (12) directly in a mechanical manner.

2. A distributor according to claim 1, characterised in that the consent valve means (19) comprise a control chamber (21) which is placed selectively in communication with the at least one inlet duct (3, 9) or discharge duct (19a) following the movement of the slider (16) from the neutral position (N).

3. A distributor according to claim 2, characterised in that, when the slider (16) is in the neutral position (N), the control chamber (21) is in discharge mode.

4. A hydraulic hoist which is controllable with regard to position and applied force, for tractors and agricultural machines, characterised in that it comprises a distributor according to claim 1.

5. A hydraulic hoist according to claim 4, characterised in that, in controlled position operation, more than 150 different positions of hoist arms can be obtained.

6. A distributor for a hydraulic hoist which is controllable with regard to position and applied force, for tractors and agricultural machines, comprising a compact body (2) having at least one inlet duct (3) for a pressurised fluid, at least one discharge duct (8, 22, 11, 19a) and at least one duct (5) for connection to a hydraulic cylinder (6) for lifting hoist arms, there being arranged in the body (2) valve means (7) for modulating the flow of pressurised fluid and for communicating with the connecting duct (5) by way of a main internal duct (9, 9a) and a valve unit (12) for discharging the fluid coming from the hydraulic lifting cylinder (6), a slider (16) being movable inside the body (2) in two opposite directions (C, S) with respect to a neutral position (N), wherein the slider (16) controls simultaneously:

the discharge valve unit (12), the modulating valve means (7), and a variable choke member (16c) in the main internal duct (9, 9a) and wherein the slider (16) controls the discharge valve unit (12) directly in a mechanical manner.

7. A distributor according to claim 6, characterised in that the variable choke member (16c) is arranged directly on the slider (16).

8. A distributor according to claim 6, characterised in that the slider (16) controls the modulating valve means (7) hydraulically with the interposition of consent valve means (19).

9. A distributor according to claim 6, characterised in that there are arranged in the body (2) controlled valve means (30) interacting with the modulating valve means (7) to limit the delivery pressure of the pump (4).

\* \* \* \* \*